(12) United States Patent
Moon

(10) Patent No.: US 11,703,907 B2
(45) Date of Patent: Jul. 18, 2023

(54) HOUSINGS WITH ELECTRICAL CONTACTS

(71) Applicant: Hewlett-Packard Development Company, L.P., Spring, TX (US)

(72) Inventor: Hyunmin Moon, Spring, TX (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 61 days.

(21) Appl. No.: 17/288,551

(22) PCT Filed: Apr. 25, 2019

(86) PCT No.: PCT/US2019/029208
§ 371 (c)(1),
(2) Date: Apr. 25, 2021

(87) PCT Pub. No.: WO2020/219056
PCT Pub. Date: Oct. 29, 2020

(65) Prior Publication Data
US 2022/0043479 A1 Feb. 10, 2022

(51) Int. Cl.
G06F 1/16 (2006.01)
(52) U.S. Cl.
CPC ............ G06F 1/1616 (2013.01); G06F 1/169 (2013.01); G06F 1/1647 (2013.01); G06F 1/1662 (2013.01); G06F 1/1681 (2013.01)
(58) Field of Classification Search
CPC .... G06F 1/1616; G06F 1/1647; G06F 1/1662; G06F 1/1681; G06F 1/166; G06F 1/169
See application file for complete search history.

(56) References Cited

U.S. PATENT DOCUMENTS

| 5,283,862 | A | * | 2/1994 | Lund | G06F 3/033 361/679.28 |
| 5,739,810 | A | * | 4/1998 | Merkel | G06F 1/1616 361/679.2 |
| 5,900,848 | A | * | 5/1999 | Haneda | G06F 1/1643 361/679.04 |
| 5,966,284 | A | * | 10/1999 | Youn | G06F 1/1669 361/679.17 |
| 6,163,326 | A | * | 12/2000 | Klein | G06F 1/1616 361/679.1 |
| 6,215,419 | B1 | * | 4/2001 | Leman | G06F 1/169 400/489 |
| 6,262,885 | B1 | | 7/2001 | Emma et al. | |
| 6,362,440 | B1 | * | 3/2002 | Karidis | G06F 1/1624 345/169 |

(Continued)

FOREIGN PATENT DOCUMENTS

CN 109426301 A 3/2019

Primary Examiner — Adrian S Wilson
(74) Attorney, Agent, or Firm — Knobbe, Martens, Olson & Bear, LLP

(57) ABSTRACT

An example apparatus Includes a first hinge, a first housing having a hinge region and a support panel, where the support panel is to extend from the hinge region. The apparatus also Includes a first display device rotatably coupled to the support panel via the first hinge, a second housing having a set of external electrical contact to provide power to a removable input device, a second hinge to rotatably couple the first housing to the second housing, and a second display device fixedly coupled to the second housing.

15 Claims, 6 Drawing Sheets

(56) References Cited

U.S. PATENT DOCUMENTS

| | | | |
|---|---|---|---|
| 6,643,124 B1 * | 11/2003 | Wilk | H04M 1/0247 345/169 |
| 6,667,877 B2 | 12/2003 | Duquette | |
| 6,697,251 B1 * | 2/2004 | Aisenberg | G06F 1/169 361/679.55 |
| 6,700,773 B1 * | 3/2004 | Adriaansen | G06F 1/1643 361/679.08 |
| 6,819,304 B2 * | 11/2004 | Branson | G06F 1/1677 345/1.3 |
| 6,870,732 B2 * | 3/2005 | Huang | G06F 1/1626 361/679.17 |
| 6,922,333 B2 * | 7/2005 | Weng | G06F 1/1616 220/230 |
| D528,541 S * | 9/2006 | Maskatia | D14/315 |
| 7,184,263 B1 * | 2/2007 | Maskatia | G06F 1/1681 361/679.09 |
| 7,221,330 B2 * | 5/2007 | Finke-Anlauff | G06F 1/1647 345/169 |
| 7,265,969 B2 * | 9/2007 | Jin | G06F 1/1616 361/679.09 |
| 7,440,269 B2 * | 10/2008 | Liao | G06F 1/1656 361/679.55 |
| 7,466,306 B2 * | 12/2008 | Connor | G06F 1/1649 345/169 |
| 7,505,252 B2 * | 3/2009 | Ma | G06F 1/1616 455/556.1 |
| 7,545,627 B1 * | 6/2009 | Lantigua | G06F 1/1684 361/679.04 |
| 7,545,631 B2 * | 6/2009 | Chen | G06F 1/1686 361/679.55 |
| 7,551,428 B2 * | 6/2009 | Homer | G06F 1/1656 250/221 |
| D621,827 S * | 8/2010 | Cheng | D14/327 |
| 7,864,524 B2 * | 1/2011 | Ladouceur | G06F 1/1616 361/679.55 |
| 7,990,702 B2 * | 8/2011 | Tracy | G06F 1/1616 361/679.55 |
| 8,023,254 B2 * | 9/2011 | Zhou | G06F 1/1669 361/679.01 |
| 8,203,832 B2 * | 6/2012 | Szabolcsi | G06F 1/1669 361/679.04 |
| 8,238,084 B2 * | 8/2012 | Chen | G06F 1/1671 361/679.14 |
| 8,254,093 B2 * | 8/2012 | Wu | H04M 1/0237 361/679.01 |
| 8,310,823 B2 * | 11/2012 | Stoltz | G06F 1/169 361/679.16 |
| 8,371,704 B1 * | 2/2013 | Lin | G06F 1/1609 359/613 |
| D683,731 S * | 6/2013 | Chiu | D14/345 |
| 8,730,669 B2 | 5/2014 | Locker et al. | |
| D717,791 S * | 11/2014 | Yun | D14/316 |
| D718,302 S * | 11/2014 | Lee | D14/316 |
| D723,028 S * | 2/2015 | Leonard | D14/316 |
| D727,310 S * | 4/2015 | Senatori | D14/315 |
| 9,025,321 B2 * | 5/2015 | Liang | G06F 1/1613 361/679.01 |
| D731,476 S * | 6/2015 | Lee | D14/316 |
| D733,120 S * | 6/2015 | Lee | D14/316 |
| 9,128,676 B2 * | 9/2015 | Chang | G06F 1/1679 |
| 9,158,335 B2 * | 10/2015 | Zheng | G06F 1/1632 |
| 9,176,525 B2 * | 11/2015 | Nakajima | G06F 1/162 |
| 9,261,906 B2 * | 2/2016 | Arima | G06F 1/1637 |
| 9,261,910 B2 * | 2/2016 | Liang | G06F 1/1632 |
| 9,436,229 B2 * | 9/2016 | Yoo | G06F 1/1637 |
| 9,483,080 B2 * | 11/2016 | Kwong | G06F 1/1643 |
| 9,658,652 B2 * | 5/2017 | McClintock | G06F 1/1681 |
| 10,013,029 B2 * | 7/2018 | Senatori | G06F 1/1616 |
| 10,142,449 B2 * | 11/2018 | Chen | H01M 50/202 |
| 10,203,728 B2 * | 2/2019 | Koo | G06F 1/1662 |
| 10,254,803 B1 * | 4/2019 | Quinn | G06F 1/1688 |
| 10,296,052 B1 * | 5/2019 | Quinn | G06F 3/03547 |
| 10,503,215 B1 * | 12/2019 | Quinn | G06F 3/0487 |
| D873,816 S * | 1/2020 | Wu | D14/315 |
| 10,564,674 B2 * | 2/2020 | Fujimoto | G06F 1/1649 |
| 10,678,300 B2 * | 6/2020 | Perelli | G06F 1/1618 |
| 10,782,733 B2 * | 9/2020 | Behar | G06F 3/04812 |
| 10,802,548 B2 * | 10/2020 | Wu | G06F 1/1607 |
| 11,023,016 B2 * | 6/2021 | Kim | G06F 1/1618 |
| 11,036,254 B2 * | 6/2021 | Tzou | G06F 3/04883 |
| 11,036,260 B2 * | 6/2021 | Smith | G06F 1/1626 |
| 11,099,605 B2 * | 8/2021 | Knoppert | G06F 1/1632 |
| 11,169,573 B2 * | 11/2021 | Schoeck | G06F 1/1656 |
| 2002/0024499 A1 * | 2/2002 | Karidis | G06F 1/1626 345/156 |
| 2002/0109662 A1 * | 8/2002 | Miller | G06F 3/1431 345/100 |
| 2002/0141146 A1 | 10/2002 | Mustoe | |
| 2003/0021082 A1 * | 1/2003 | Lu | G06F 1/1669 400/82 |
| 2004/0012509 A1 * | 1/2004 | Chen | G06F 1/1669 361/679.17 |
| 2004/0108968 A1 * | 6/2004 | Finke-Anlauff | G06F 1/1616 345/1.1 |
| 2004/0155862 A1 * | 8/2004 | Higginson | G06F 1/169 345/156 |
| 2004/0159762 A1 * | 8/2004 | Ghosh | G06F 1/162 248/351 |
| 2004/0190239 A1 * | 9/2004 | Weng | G06F 1/1669 361/679.2 |
| 2005/0063145 A1 * | 3/2005 | Homer | G06F 1/162 361/679.21 |
| 2005/0128695 A1 | 6/2005 | Han | |
| 2006/0077622 A1 | 4/2006 | Keely et al. | |
| 2007/0217135 A1 * | 9/2007 | Chuang | G06F 1/1681 361/679.05 |
| 2009/0021903 A1 | 1/2009 | Chen et al. | |
| 2010/0039764 A1 * | 2/2010 | Locker | G06F 1/1615 361/679.29 |
| 2010/0207888 A1 | 8/2010 | Camiel | |
| 2010/0328549 A1 * | 12/2010 | Wu | G06F 1/1662 348/744 |
| 2011/0026210 A1 * | 2/2011 | Tracy | G06F 1/1616 361/679.17 |
| 2012/0194977 A1 * | 8/2012 | Liu | G06F 1/162 361/679.01 |
| 2014/0063717 A1 * | 3/2014 | Tseng | G06F 1/1624 361/679.21 |
| 2014/0204519 A1 * | 7/2014 | Wu | G06F 1/1669 361/679.17 |
| 2015/0002998 A1 | 1/2015 | Arima et al. | |
| 2015/0346775 A1 * | 12/2015 | Tseng | G06F 1/1656 361/679.27 |
| 2016/0246335 A1 * | 8/2016 | Senatori | G06F 1/162 |
| 2017/0337025 A1 | 11/2017 | Finnan | |
| 2018/0210508 A1 * | 7/2018 | Aurongzeb | G06F 1/1652 |
| 2019/0220061 A1 * | 7/2019 | Fujimoto | G06F 1/16 |
| 2019/0339738 A1 * | 11/2019 | Hou | G06F 1/1652 |
| 2019/0339744 A1 * | 11/2019 | Oakley | G06F 1/1681 |
| 2020/0064889 A1 * | 2/2020 | Liang | G06F 1/1616 |
| 2020/0064892 A1 * | 2/2020 | Iyer | G06F 3/0487 |
| 2020/0110470 A1 * | 4/2020 | Meyers | G06F 3/044 |
| 2020/0233536 A1 * | 7/2020 | Hong | G06F 1/1641 |
| 2020/0319674 A1 * | 10/2020 | Knoppert | G06F 1/1632 |
| 2020/0349895 A1 * | 11/2020 | Files | G09G 3/20 |

* cited by examiner

HOUSINGS WITH ELECTRICAL CONTACTS

BACKGROUND

A laptop computer is a type of computing device. A laptop computer may have a clamshell configuration where the laptop computer has a first housing and a second housing connected together.

BRIEF DESCRIPTION OF THE DRAWINGS

Some examples of the present application are described with respect to the following figures.

DETAILED DESCRIPTION

A laptop computer may include a single display device in one of the laptop computer's housings. To provide additional display areas, a laptop computer may include an additional display device in the other housing of the laptop computer. However, the additional display device may displace a physical input device of the laptop computer, such as a keyboard, due to the limited amount of space in the housing. Examples described herein provide an approach to enable a laptop computer to receive input from a physical input device while providing power to the input device.

In an example, an apparatus may include a first hinge, a first housing having a hinge region and a support panel, where the support panel may extend from the hinge region. The apparatus may also include a first display device rotatably coupled to the support panel via the first hinge. The apparatus may further include a second housing having a set of external electrical contact to provide power to a removable input device. The apparatus may further include a second hinge to rotatably couple the first housing to the second housing. The apparatus may further include a second display device fixedly coupled to the second housing.

In an example, an apparatus may include a first housing and a second housing including a first set of electrical contacts. The apparatus may also include a second hinge to rotatably couple the first housing to the second housing. The apparatus may further include an input device disposed on the second housing, where the input device may include a device holder. The device holder may include a body portion to retain an accessory device. The device holder may also include a second set of electrical contacts disposed on the body portion, and where the input device may receive power from the first set of electrical contacts via the second set of electrical contacts.

In an example, an apparatus may include a keyboard. The keyboard may include a wireless communication device to exchange data with a controller of an electronic device. The keyboard may also include a device holder. The device holder may include a body portion defining a channel to retain an accessory device. The device holder may also include a set of electrical contact disposed on the body portion. The keyboard may receive power from the electronic device via the set of electrical contacts. Thus, examples described herein may increase the available display area in a laptop computer as compared to a laptop computer having a single display device while maintaining the flexibility to receive input from a physical input device.

Figure 1:
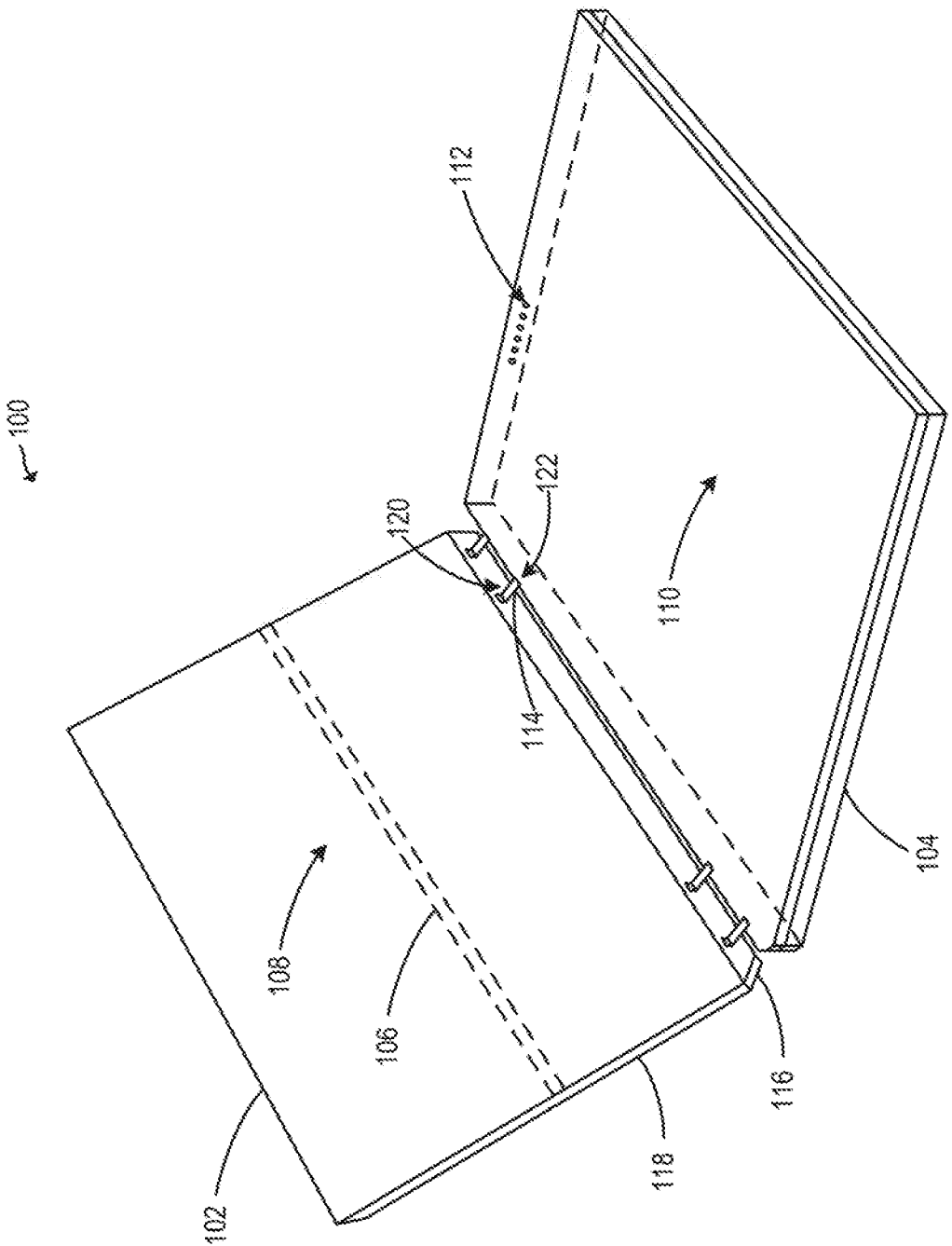
FIG. 1 illustrates a perspective view of an electronic device having a set of electrical contacts to provide power to an input device, according to an example.

FIG. 1 illustrates a perspective view of an electronic device 100 having a set of electrical contacts to provide power to an input device, according to an example. Electronic device 100, for example, may be a laptop/notebook computer, a tablet computer, or any other type of computing device having two housings.

Electronic device 100 may include a first housing 102, a second housing 104, a first hinge 106, a first display device 108, a second display device 110, a first set of electrical contacts 112, and a second hinge 114. First hinge 106 and first display device 108 may be disposed in first housing 102. First set of electrical contacts 112, second hinge 114, and second display device 110 may be disposed in second housing 104. First housing 102 may be rotatably coupled to second housing 104 via second hinge 114.

First housing 102 may include a hinge region 116 and a support panel 118. Second hinge 114 may include a first end 120 and a second end 122. First end 120 may be disposed in hinge region 116 and second end 122 may be disposed in second housing 104 to enable rotation of first housing 102 relative to second housing 104. Support panel 118 may provide structural support for first display device 108. First display device 108 may be rotatably coupled to support panel 118 via first hinge 106. As described in more detail in FIGS. 6A-68, first display device 108 may be rotated via first hinge 106 to change a configuration of electronic device 100. In some examples, second display device 110 may be fixedly coupled to second housing 104. That is, second display device 110 may not be able to rotate relative to second housing 104.

During operation, content (e.g., image, graphical user interface, data, video, etc.) may be displayed on first display device 108, second display device 110, or a combination thereof. In some examples, first display device 108, second display device 110, or a combination thereof may include touch sensors. Thus, first display device 108 and/or second display device 110 may receive physical touch as input. For example, a virtual input device (e.g., a graphical keyboard) may be displayed in first display device 108 and/or second display device 110. A user may provide input to control operations of electronic device 100 via the virtual input device. To provide stronger tactile feedback to a user when the user is providing input, electronic device 100 may receive a removeable input device, the input device is described in more detail in FIG. 2.

Figure 2:
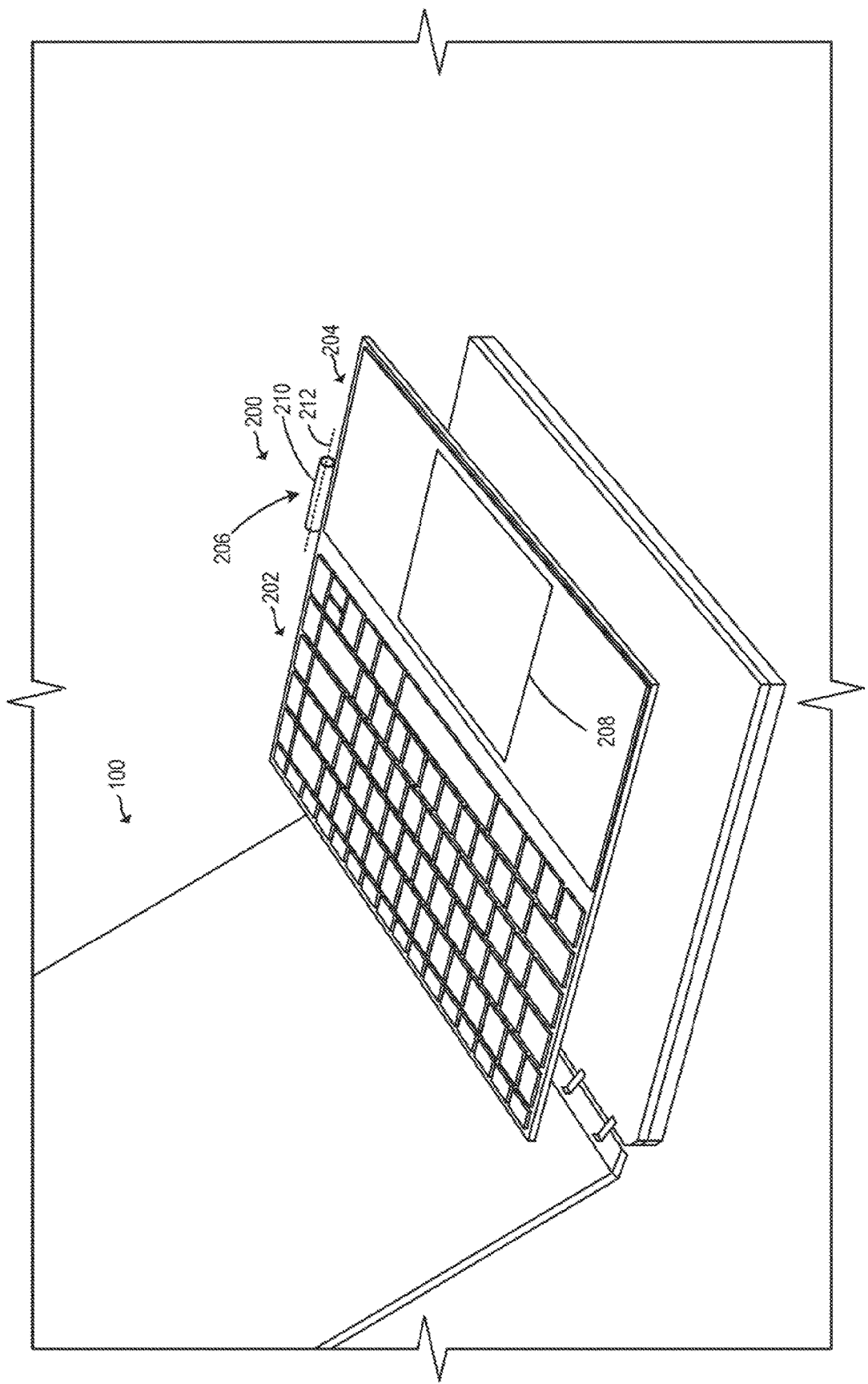
FIG. 2 illustrates a perspective view of the electronic device of FIG. 1 receiving an input device, according to an example.

Turning to FIG. 2, FIG. 2 illustrates a perspective view of electronic device 100 of FIG. 1 receiving an input device 200, according to an example. Input device 200 may be a keyboard. Input device 200 may include keyboard portion 202, a touchpad portion 204, and a device holder 206. Keyboard portion 202 may include a plurality of buttons or keys. Touchpad portion 204 may include a touchpad 208 to receive touch input.

Device holder 206 may include a body portion 210 and a second set of electrical contacts (not shown in FIG. 2). Body portion 210 may be shaped to define a channel 212 to retain an accessory device. In some examples, the accessory device may be a stylus, a pen, or any other instrument used to provide input to electronic device 100. In some examples, body portion 210 may be made from elastic or stretchable material, such as fabric material. In some examples, body portion 210 may be made from rigid material, such as metal or plastic. As described in more detail in FIG. 3A, the second set of electrical contacts may be disposed on body portion 210 to enable input device 200 to receive electrical power from electronic device 100.

Turning to FIGS. 3A-3I, FIG. 3A illustrates a perspective view of a second set of electrical contacts 300 disposed on device holder 206 of input device 200 of FIG. 2, according to an example. Second set of electrical contacts 300 may be disposed on the bottom of body portion 210 such that second set of electrical contacts is oriented towards second housing 104 when input device 200 is disposed on second housing 104. Also illustrated in FIG. 3A, a stylus 302 may be retained by device holder 206.

Figure 3B:
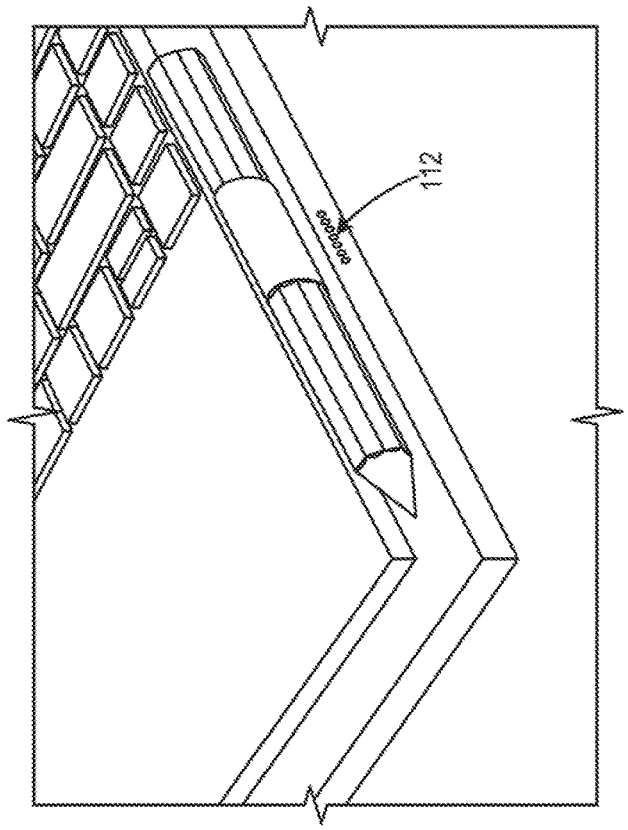
FIG. 3B illustrates a perspective view of the set of electrical contacts of the electronic device of FIG. 1, according to an example.
Figure 3A:
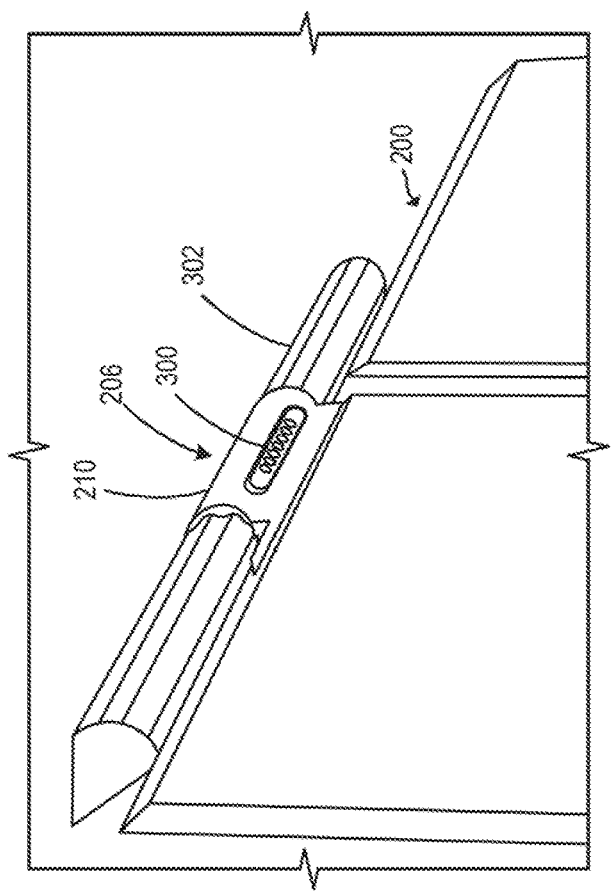
FIG. 3A illustrates a perspective view of a set of electrical contacts disposed on a device holder of the input device of FIG. 2, according to an example.

Turning to FIG. 3B, when input device 200 is disposed on second housing 104, first set of electrical contacts 112 may make physical contact with second set of electrical contacts 300 (not shown in FIG. 3B). Thus, electrical power may be passed from electronic device 100 to input device 200 via sets of electrical contacts 112 and 300. In some examples, first set of electrical contacts 112 and second set of electrical contacts 300 may be implemented using spring-loaded electrical contacts, such as pogo pins.

Figure 4:
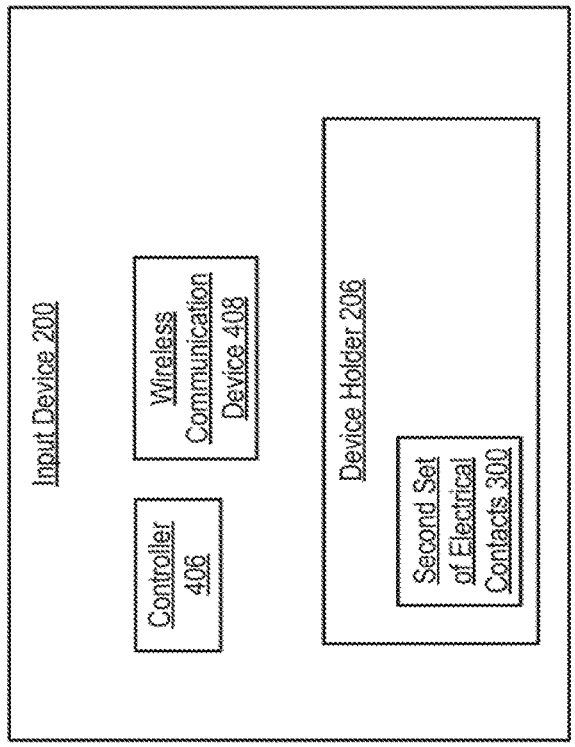
FIG. 4 illustrates functional blocks of the electronic device of FIG. 1 and the input device of FIG. 2, according to an example.
Figure 4:
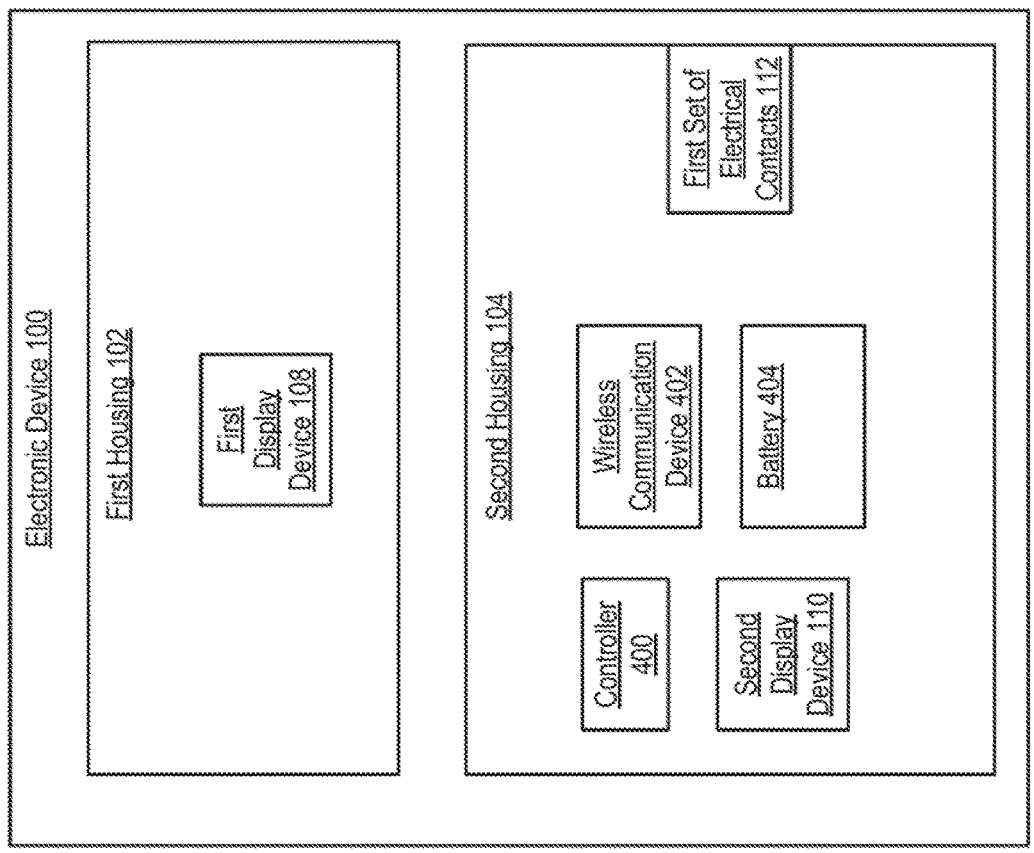

FIG. 4 illustrates functional blocks of electronic device 100 of FIG. 1 and input device 200 of FIG. 2, according to an example. In addition to components described in FIG. 1, electronic device 100 may also include a controller 400, a wireless communication device 402, and a battery 404. Controller 400 may control operations of electronic device 100. Wireless communication device 402 may transmit data from electronic device 100 to another device. Wireless communication device 402 may also receive data from another device. Battery 404 may provide electrical power to electrical components of electronic device 100. The electrical power from battery 404 may also be used to power input device 200.

In addition to components described in FIG. 2, input device 200 may also include a controller 406 and a wireless communication device 408. Controller 406 may control operations of input device 200. Wireless communication device 408 may transmit and/or receive data for input device 200.

During operation, when input device 200 is disposed on second housing 104, first set of electrical contacts 112 may mate with second set of electrical contacts 300, electrical power from battery 404 may be provided to input device 200 via electrical contacts 112 and 300. Electronic device 100 may exchange data with input device 200 wirelessly via wireless communication device 402. Input device 200 may exchange data with electronic device 100 via wireless communication device 408.

In some examples, controller 400 and 406 may each be implemented using a central processing unit (CPU), a semiconductor-based microprocessor, and/or other hardware devices suitable for retrieval and execution of instructions stored in respective device 100 and 200. In some examples, wireless communication devices 402 and 408 may each include a transmitter and a receiver to perform communications via radio waves. Different wireless communication technologies may be used to perform communications. In some examples, devices 100 and 200 may exchange data using Institute of Electrical and Electronics Engineers (IEEE) 802.11 protocols. In some examples, devices 100 and 200 may exchange data using short wavelength ultra high frequency radio waves, such as Bluetooth.

Figure 5B:
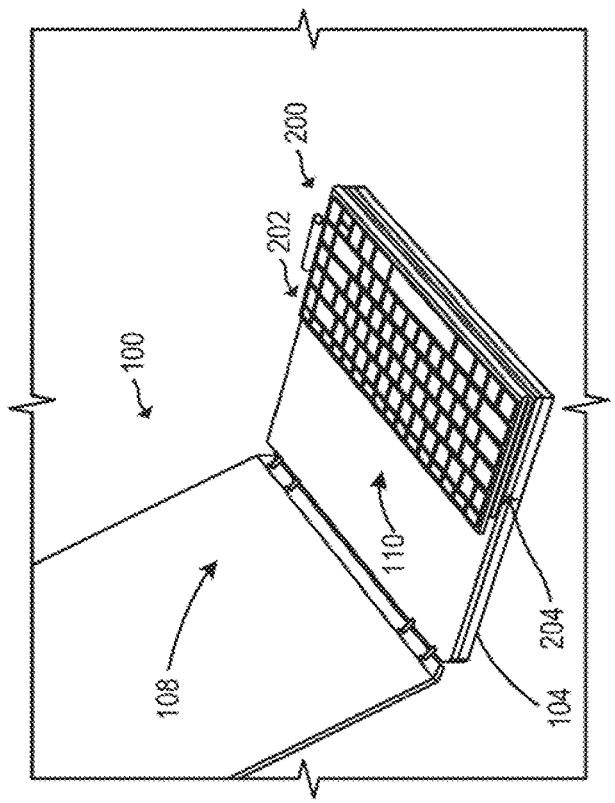
FIGS. 5A-5B illustrate the input device of FIG. 2 folding in half to reposition the input device on the electronic device of FIG. 1, according to an example.
Figure 5A:
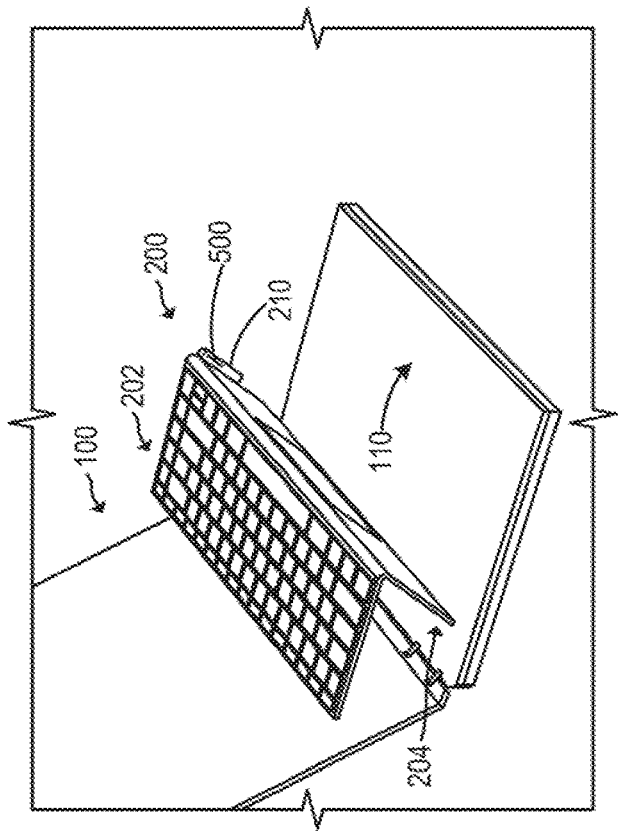

FIGS. 5A-5B illustrate input device 200 of FIG. 2 folding in half to reposition input device 200 on electronic device 100 of FIG. 1, according to an example. Turning to FIG. 5A, in some examples, when input device 200 is disposed on second housing 104, input device 200 may overlap second display device 110. Thus, a user may not be able to use second display device 110. To maintain the use of having multiple display devices, input device 200 may fold in half along the intersection between keyboard portion 202 and touchpad portion 204. In some examples, input device 200 may implement a living hinge at the intersection to enable the folding. In some examples, input device 200 may include a third set of electrical contacts 500 at the top of body portion 210 so that input device 200 may also receive power from electronic device 100 in a folded configuration.

Turning to FIG. 5B, input device 200 may be in the folded configuration where keyboard portion 202 may be on top of touchpad portion 204. Input device 200 may be disposed on the lower half of second housing 104. Thus, input device 200 may overlap with half of second display device 110. The other half of second display device 110 may be used to display content. A user of electronic device 100 may still utilize both display devices 108 and 110 while providing input using input device 200.

Although the folded configuration illustrates keyboard portion 202 being on top of touchpad portion 204, it should be understood that input device 200 may be in a different folded configuration where touchpad portion 204 is on top of keyboard portion 202.

Figure 6A:
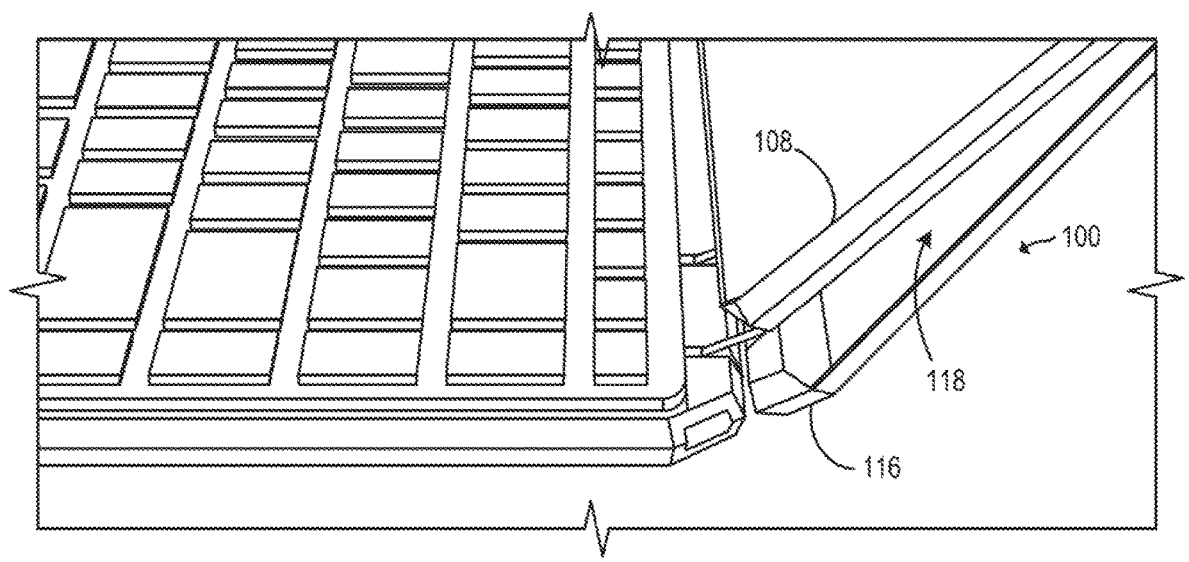
FIG. 6A illustrates a display device of the electronic device of FIG. 1 rotating to change a configuration of the electronic device, according to an example.

FIG. 6A illustrates first display device 108 of electronic device 100 of FIG. 1 rotating to change a configuration of electronic device 100, according to an example. In some situations, a user of electronic device 100 may reposition first display device 108 so that first display device 108 rests on second housing 104. The user may pull first display device 108 towards second housing 104. When first display device 108 is pulled, first display device 108 may rotate via first hinge 106 (not shown in FIG. 6A) and move away from support panel 118. In some examples, first hinge 106 may include a first end and a second end (not shown in FIG. 6A). The first end may be disposed in support panel 118 and the second end may be disposed in first display device 108 to enable the rotation. As illustrated in FIG. 6A, hinge region 116 has a greater thickness than support panel 118 to account for the thickness of first display device 108. Thus, when first display device 108 is disposed above hinge region 116 and in contact with support panel 118, first display device 108, support panel 118, and hinge region 116 may appear to have a uniform thickness.

Figure 6B:
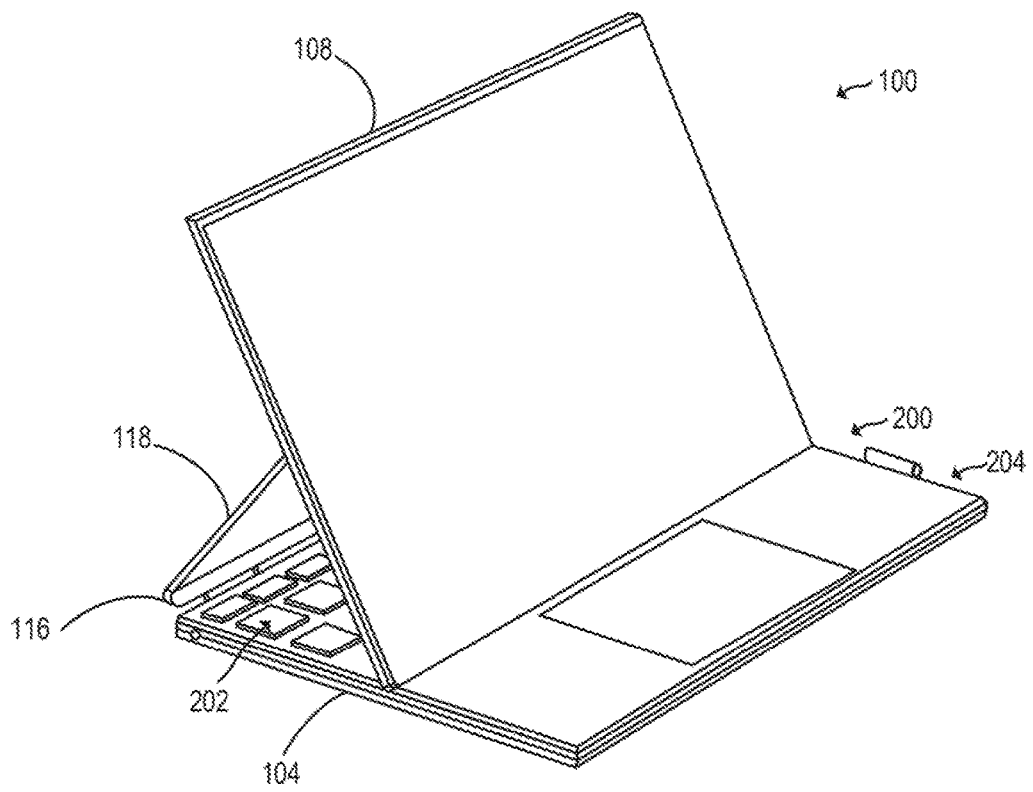
FIG. 6B illustrates the electronic device of FIG. 1 in a pulled forward configuration, according to an example.

FIG. 6B illustrates electronic device 100 of FIG. 1 in a pulled forward configuration, according to an example. As illustrated in FIG. 6B, when electronic device 100 is in the pulled forward configuration, first display device 108 may rest on second housing 104. When input device 200 is disposed on second housing 104, first display device 108 may rest on input device 200, between keyboard portion 202 and touchpad portion 204.

The use of "comprising", "including" or "having" are synonymous and variations thereof herein are meant to be inclusive or open-ended and do not exclude additional unrecited elements or method steps.

What is claimed is:

1. An apparatus comprising:
   a first hinge;
   a first housing having a hinge region and a support panel, wherein the support panel is to extend from the hinge region;
   a first display device rotatably coupled to the support panel via the first hinge;
   a removable input device;
   a second housing having a first set of external electrical contacts to provide power to the removable input device;
   a second hinge to rotatably couple the first housing to the second housing; and
   a second display device fixedly coupled to the second housing;
   wherein the removable input device includes a device holder, wherein the device holder includes:
      a body portion to retain an accessory device; and
      a second set of electrical contacts disposed on the body portion, and wherein the input device is to receive power from the first set of electrical contacts via the second set of electrical contacts.

2. The apparatus of claim 1, wherein the first hinge includes a first end and a second end, wherein the first end is disposed in the support panel, and wherein the second end is disposed in the first display device.

3. The apparatus of claim 1, wherein the hinge region has a greater thickness than the support panel.

4. The apparatus of claim 1, wherein the second hinge includes a first end and a second end, wherein the first end is disposed in the hinge region, and wherein the second end is disposed in the second housing.

5. The apparatus of claim 1, wherein the first display device is disposed above the hinge region.

6. An apparatus comprising:
   a first housing;
   a second housing including a first set of electrical contacts;
   a hinge to rotatably couple the first housing to the second housing; and
   an input device disposed on the second housing, wherein the input device includes a device holder, wherein the device holder includes:
      a body portion to retain an accessory device; and
      a second set of electrical contacts disposed on the body portion, and wherein the input device is to receive power from the first set of electrical contacts via the second set of electrical contacts.

7. The apparatus of claim 6, wherein the second set of electrical contacts is oriented towards the second housing when the input device is disposed on the second housing.

8. The apparatus of claim 6, wherein the first housing includes a first display device, and wherein the second housing includes a second display device.

9. The apparatus of claim 8, wherein the input device is to overlap the second display device when the input device is disposed on the second housing.

10. The apparatus of claim 6, wherein the apparatus further includes:
    a controller; and
    a wireless communication device, and wherein the controller is to exchange data with the input device via the wireless communication device.

11. An apparatus comprising:
    a keyboard includes:
       a wireless communication device to exchange data with a controller of an electronic device; and
       a device holder, wherein the device holder includes:
          a body portion defining a channel to retain an accessory device; and
          a set of electrical contact disposed on the body portion, and wherein the keyboard is to receive power from the electronic device via the set of electrical contacts.

12. The apparatus of claim 11, wherein the keyboard further includes a key portion and a touchpad portion.

13. The apparatus of claim 11, wherein the set of electrical contacts is disposed on a bottom of the body portion.

14. The apparatus of claim 11, wherein the set of electrical contacts is a set of spring-loaded electrical contacts.

15. The apparatus of claim 11, wherein the wireless communication device is to exchange the data via ultra high frequency radio waves.

* * * * *